US012552350B2

(12) United States Patent
Shah et al.

(10) Patent No.: US 12,552,350 B2
(45) Date of Patent: Feb. 17, 2026

(54) DRIVER'S AUTOMATIC EMERGENCY BRAKE (AEB) HANDLING SCORE CARD

(71) Applicant: Robert Bosch GmbH, Stuttgart (DE)

(72) Inventors: Ankit Shah, Canton, MI (US); Erica R. Hingst, Plymouth, MI (US); Sivaraja Velusamy, Northville, MI (US); Anthony J. Farrell, Brooklyn, MI (US)

(73) Assignee: Robert Bosch GmbH, Stuttgart (DE)

( * ) Notice: Subject to any disclaimer, the term of this patent is extended or adjusted under 35 U.S.C. 154(b) by 672 days.

(21) Appl. No.: 17/837,722

(22) Filed: Jun. 10, 2022

(65) Prior Publication Data

US 2023/0398965 A1 Dec. 14, 2023

(51) Int. Cl.
| | | |
|---|---|---|
| B60T 7/22 | (2006.01) | |
| B60K 35/10 | (2024.01) | |
| B60K 35/22 | (2024.01) | |
| B60K 35/25 | (2024.01) | |
| B60K 35/26 | (2024.01) | |

(Continued)

(52) U.S. Cl.
CPC .............. B60T 7/22 (2013.01); B60K 35/10 (2024.01); B60T 8/174 (2013.01); B60K 35/22 (2024.01); B60K 35/25 (2024.01); B60K 35/26 (2024.01); B60K 35/28 (2024.01); B60K 35/29 (2024.01); B60K 2360/16 (2024.01); B60K 2360/18 (2024.01); B60T 2201/024 (2013.01); B60T 2220/02 (2013.01)

(58) Field of Classification Search
CPC ...... B60T 7/22; B60T 8/174; B60T 2201/024; B60T 2220/02; B60K 35/00; B60K 35/22; B60K 35/28; B60K 35/29; B60K 2360/16; B60K 2360/18; B60K 35/10; B60K 35/25; B60K 35/26; B60K 35/21; B60W 2540/30
USPC .......................................................... 701/70
See application file for complete search history.

(56) References Cited

U.S. PATENT DOCUMENTS

| | | |
|---|---|---|
| 9,619,203 B2 | 4/2017 | Tamir et al. |
| 10,198,772 B2 | 2/2019 | Parameshwaran |

(Continued)

FOREIGN PATENT DOCUMENTS

| | | | | |
|---|---|---|---|---|
| CN | 114897312 A | * | 8/2022 | ............. G06F 18/24 |

OTHER PUBLICATIONS

CN-114897312-A—English Translation (Year: 2022).*

*Primary Examiner* — Scott A Reinbold
(74) *Attorney, Agent, or Firm* — Michael Best & Friedrich LLP (57) ABSTRACT

A system for controlling a vehicle using driving behavior involving automatic emergency braking (AEB) events. The system includes a plurality of sensors and an electronic processor. The system receives event data of an attribute of a driving behavior of a user related to handling an AEB event of a vehicle from the plurality of sensors. The system assigns a weighted value to the attribute based on a set of conditions for the attribute and the event data. The system determines an event score of the driving behavior related to the AEB event based on the weighted value of the attribute. The system determines a user driving behavior score based on the event score associated with one or more AEB events handled by the user. The system activates a vehicle countermeasure related to attributes responsive to determining the driving behavior score of the user is greater than a driving behavior threshold.

18 Claims, 7 Drawing Sheets

| Variable Attribute | Index Value | Weightage Point Category1 | Weightage Point Category2 | Weightage Point Category3 | Weightage Point Category4 |
|---|---|---|---|---|---|
| Total Number Of AEB Events (In A Given Drive Cycle) | A | Event 1<br>0.25 | Event 2<br>0.5 | Event 3<br>0.75 | Event 4<br>1 |
| Deceleration Of AEB Activation (Zone1:0-3m/s², Zone2:3-5m/s², Zone3:5-8m/s², Zone4:8-10m/s²) | B | Decel Zone 1<br>0.25 | Decel Zone 2<br>0.5 | Decel Zone 3<br>0.75 | Decel Zone 4<br>1 |
| Drive Interaction (On Brake, On Accelerator) | C | No Gas, Sufficient Brake Torque Input<br>0.25 | Drive Off The Accelerator, No Brake Input<br>0.75 | Drive Off The Accelerator, Not Sufficient Brake<br>0.75 | On Accelerator<br>1 |
| Whether The AEB Even Ended In Contact With An Object (Airbag Info Or SCM Activation) | D | Distance Zone 1<br>0.25 | Distance Zone 2<br>0.5 | Crash Detection & No Airbag Deployment<br>0.75 | Airbag Deployment<br>1 |
| Speed Of AEB Event | E | Speed Zone 1<br>0.25 | Speed Zone 2<br>0.5 | Speed Zone 3<br>0.75 | Speed Zone 4<br>1 |
| Time Between AEB Activations (Across Multiple Drive Cycle) | F | Ten Ignition Cycles<br>0.25 | 7 Ignition Cycles<br>0.5 | 4 Ignition Cycles<br>0.75 | 2 Ignition Cycles<br>1 |
| Passenger Detection | G | Passenger Detection SW Malfunction<br>0 | Passenger Detection HW Malfunction<br>0 | Front Passenger Not Presence Rear Passenger Presence<br>0.5 | Passenger Presence<br>1 |
| Seatbelt Detection | H | Seatbelt SW Malfunction<br>0 | Seatbelt HW Malfunction<br>0 | Seatbelt Buckled<br>0.5 | Seatbelt Unckled<br>1 |
| Lane Keep Or Departure | I | Lane Keep SW Malfunction<br>0 | Lane Keep HW Malfunction<br>0 | Lane Keep Indicator Passive<br>0.5 | Lane Keep Indicator Active<br>1 |

300a (51) Int. Cl.
*B60K 35/28* (2024.01)
*B60K 35/29* (2024.01)
*B60T 8/174* (2006.01)

(56) References Cited

U.S. PATENT DOCUMENTS

| | | |
|---|---|---|
| 10,308,181 B2 | 6/2019 | Nix |
| 10,467,824 B2 | 11/2019 | Rosenbaum |
| 10,730,526 B2 | 8/2020 | Fredman |
| 2014/0039749 A1* | 2/2014 | Jelbert .................. G07C 5/085 |
| | | 701/32.1 |
| 2017/0369069 A1 | 12/2017 | Yen et al. |
| 2019/0064848 A1* | 2/2019 | Hofsaess ................. H04W 4/44 |
| 2021/0248399 A1* | 8/2021 | Martin .................... G06F 3/013 |
| 2022/0005086 A1* | 1/2022 | Ittiachen ............ G06Q 30/0207 |
| 2023/0347876 A1* | 11/2023 | Quint ................... B60W 30/14 |

* cited by examiner

| Variable Attribute | Index Value | Weightage Point Category1 | Weightage Point Category2 | Weightage Point Category3 | Weightage Point Category4 |
|---|---|---|---|---|---|
| Total Number Of AEB Events (In A Given Drive Cycle) | A | Event 1<br>0.25 | Event 2<br>0.5 | Event 3<br>0.75 | Event 4<br>1 |
| Deceleration Of AEB Activation (Zone1:0-3m/s², Zone2:3-5m/s², Zone3:5-8m/s², Zone4:8-10m/s²) | B | Decel Zone 1<br>0.25 | Decel Zone 2<br>0.5 | Decel Zone 3<br>0.75 | Decel Zone 4<br>1 |
| Drive Interaction (On Brake, On Accelerator) | C | No Gas, Sufficient Brake Torque Input<br>0.25 | Drive Off The Accelerator, No Brake Input<br>0.75 | Drive Off The Accelerator, Not Sufficient Brake<br>0.75 | On Accelerator<br>1 |
| Whether The AEB Even Ended In Contact With An Object (Airbag Info Or SCM Activation) | D | Distance Zone 1<br>0.25 | Distance Zone 2<br>0.5 | Crash Detection & No Airbag Deployment<br>0.75 | Airbag Deployment<br>1 |
| Speed Of AEB Event | E | Speed Zone 1<br>0.25 | Speed Zone 2<br>0.5 | Speed Zone 3<br>0.75 | Speed Zone 4<br>1 |
| Time Between AEB Activations (Across Multiple Drive Cycle) | F | Ten Ignition Cycles<br>0.25 | 7 Ignition Cycles<br>0.5 | 4 Ignition Cycles<br>0.75 | 2 Ignition Cycles<br>1 |
| Passenger Detection | G | Passenger Detection SW Malfunction<br>0 | Passenger Detection HW Malfunction<br>0 | Front Passenger Not Presence Rear Passenger Presence<br>0.5 | Passenger Presence<br>1 |
| Seatbelt Detection | H | Seatbelt SW Malfunction<br>0 | Seatbelt HW Malfunction<br>0 | Seatbelt Buckled<br>0.5 | Seatbelt Unckled<br>1 |
| Lane Keep Or Departure | I | Lane Keep SW Malfunction<br>0 | Lane Keep HW Malfunction<br>0 | Lane Keep Indicator Passive<br>0.5 | Lane Keep Indicator Active<br>1 |

FIG. 3A

| Variable Attribute | Index Value | Weightage Point Category1 | Weightage Point Category2 | Weightage Point Category3 | Weightage Point Category4 |
|---|---|---|---|---|---|
| Total Number Of AEB Events (In A Given Drive Cycle) | A | Event 1<br>0.25 | Event 2<br>0.5 | Event 3<br>0.75 | Event 4<br>1 |
| Deceleration Of AEB Activation (Zone1:0-3m/s², Zone2:3-5m/s², Zone3:5-8m/s², Zone4:8-10m/s²) | B | Decel Zone 1<br>0.25 | Decel Zone 2<br>0.5 | Decel Zone 3<br>0.75 | Decel Zone 4<br>1 |
| Drive Interaction (On Brake, On Accelerator) | C | No Gas, Sufficient Brake Torque Input<br>0.25 | Drive Off The Accelerator, No Brake Input<br>0.5 | Drive Off The Accelerator, Not Sufficient Brake<br>0.75 | On Accelerator<br>1 |
| Whether The AEB Even Ended In Contact With An Object (Airbag Info Or SCM Activation) | D | Distance Zone 1<br>0.25 | Distance Zone 2<br>0.5 | Crash Detection & No Airbag Deployment<br>0.75 | Airbag Deployment<br>1 |
| Speed Of AEB Event | E | Speed Zone 1<br>0.25 | Speed Zone 2<br>0.5 | Speed Zone 3<br>0.75 | Speed Zone 4<br>1 |
| Time Between AEB Activations (Across Multiple Drive Cycle) | F | Ten Ignition Cycles<br>0.25 | 7 Ignition Cycles<br>0.5 | 4 Ignition Cycles<br>0.75 | 2 Ignition Cycles<br>1 |
| Passenger Detection | G | Passenger Detection SW Malfunction<br>0 | Passenger Detection HW Malfunction<br>0 | Front Passenger Not Presence Rear Passenger Presence<br>0.5 | Passenger Presence<br>1 |
| Seatbelt Detection | H | Seatbelt SW Malfunction<br>0 | Seatbelt HW Malfunction<br>0 | Seatbelt Buckled<br>0.5 | Seatbelt Unckled<br>1 |
| Lane Keep Or Departure | I | Lane Keep SW Malfunction<br>0 | Lane Keep HW Malfunction<br>0 | Lane Keep Indicator Passive<br>0.5 | Lane Keep Indicator Active<br>1 |

FIG. 3B

| AEB Event Number | Index A | Index B | Index C | Index D | Index E | Index F | Index G | Index H | Index I | AEB Score |
|---|---|---|---|---|---|---|---|---|---|---|
| 1 (FIG. 3B) | 0.5 | 1 | 0.75 | 0.5 | 0.5 | 0.75 | 0.5 | 0.5 | 0.5 | 0.667 |
| 2 | 0.25 | 0.5 | 1 | 1 | 0.25 | 0.5 | 0.5 | 1 | 0 | 0.556 |
| Overall AEB Score | | | | | | | | | | 0.612 |

DRIVER'S AUTOMATIC EMERGENCY BRAKE (AEB) HANDLING SCORE CARD

BACKGROUND

Automatic emergency braking (AEB) is a collision avoidance technology that may be implemented in a system that engages a main braking system in automobiles when an imminent collision is detected. For example, AEB systems detect pedestrians and cyclists that enter a path of travel of a vehicle and activate the braking system in an attempt to slow or stop the vehicle before a collision occurs.

SUMMARY

AEB systems help reduce accidents particularly when drivers fail to react quickly enough when a person or other object enters a path of travel. However, currently existing AEB systems are not capable of being adjusted to suit driving behaviors of individuals driving the vehicle. Thus, AEB systems do not consider driving behaviors of the vehicle driver. Existing AEB systems also fail to consider driving behaviors of drivers of other vehicles when detecting or determining potential impacts and activating vehicle countermeasures. In some instances, driver behavior can be extrapolated or determined by measuring the number of times an AEB system is activated. However, driving behavior determined solely from the number of times an AEB system is activated provides a limited representation of driving behavior and fails to consider other characteristics of driving behavior that a distinct representation of an individual's driving behavior. Examples described herein provide, among other things, measure and rating of an individual's driving behavior related to handling situations where AEB functions are activated. Other examples described herein provide, among other things, real-time reporting, scoring of driving behavior, and vehicle countermeasures based on driving behavior.

On example provides a system for controlling a vehicle using driving behavior involving automatic emergency braking (AEB) events. The system includes a plurality of sensors and an electronic processor. The electronic processor is configured to receive event data of an attribute of a driving behavior of a user related to handling an automatic emergency braking (AEB) event of a vehicle from the plurality of sensors. The electronic processor is also configured to assign a weighted value to the attribute based on a set of conditions for the attribute and the event data. The electronic processor is further configured to determine an event score of the driving behavior related to the AEB event based on the weighted value of the attribute. The electronic processor is also configured determine a driving behavior score of the user based on the event score, wherein the driving behavior score is an overall score associated with one or more AEB events handled by the user. The electronic processor is further configured to activate a vehicle countermeasure related to one or more attributes responsive to determining the driving behavior score of the user is greater than a driving behavior threshold.

Another example provides a method of controlling a vehicle using driving behavior involving automatic emergency braking (AEB) events of a vehicle. The method includes receiving, by an electronic processor, from a plurality of sensors of a vehicle, event data of an attribute of a driving behavior of a user related to handling an automatic emergency braking (AEB) event of a vehicle. The method also includes assigning, by the electronic processor, a weighted value to the attribute based on a set of conditions for the attribute and the event data. The method further includes determining, by the electronic processor, an event score of the driving behavior related to the AEB event based on the weighted value of the attribute. The method also includes determining, by the electronic processor, a driving behavior score of the user based on the event score, wherein the driving behavior score is an overall score associated with one or more AEB events handled by the user. The method further includes activating, by the electronic processor, a vehicle countermeasure related to one or more attributes responsive to determining the driving behavior score of the user is greater than a driving behavior threshold.

These and other features, aspects, and advantages will be apparent from a reading of the following detailed description and a review of the associated drawings. It is to be understood that both the foregoing general description and the following detailed description are explanatory and do not restrict aspects as claimed.

BRIEF DESCRIPTION OF THE DRAWINGS

FIG. 3B is a table illustrating a driver behavior index according to some instances.

DETAILED DESCRIPTION

Before any examples, aspects, features, or instances of the invention are explained in detail, it is to be understood that the invention is not limited in its application to the details of construction and the arrangement of components set forth in the following description or illustrated in the following drawings. The invention may include or being embodied in other aspects, features, or instances and may be practiced or carried out in various ways.

It should also be noted that a plurality of hardware and software-based devices, as well as a plurality of different structural components may be used to implement the aspects, features, examples, instances, and embodiments presented herein. In addition, it should be understood that aspects may include hardware, software, and electronic components that, for purposes of discussion, may be illustrated and described as if the majority of the components were implemented solely in hardware. However, one of ordinary skill in the art, and based on a reading of this detailed description, would recognize that, in at least some instances, the electronic based aspects may be implemented in software (for example, stored on non-transitory computer-readable medium) executable by one or more processors. As such, it should be noted that a plurality of hardware and software-based devices, as well as a plurality of different structural components may be utilized to implement certain aspects and features presented. For example, "control units" and "controllers" described in the specification can include one or more electronic processors, one or more memory modules including non-transitory computer-readable medium, one or more input/output interfaces, and various connections (for example, a system bus) connecting the components.

For ease of description, some example systems presented herein are illustrated with a single exemplar of each of its component parts. Some examples may not describe or illustrate all components of the systems. Other examples may include more or fewer of each of the illustrated components, may combine some components, or may include additional or alternative components.

Figure 1:
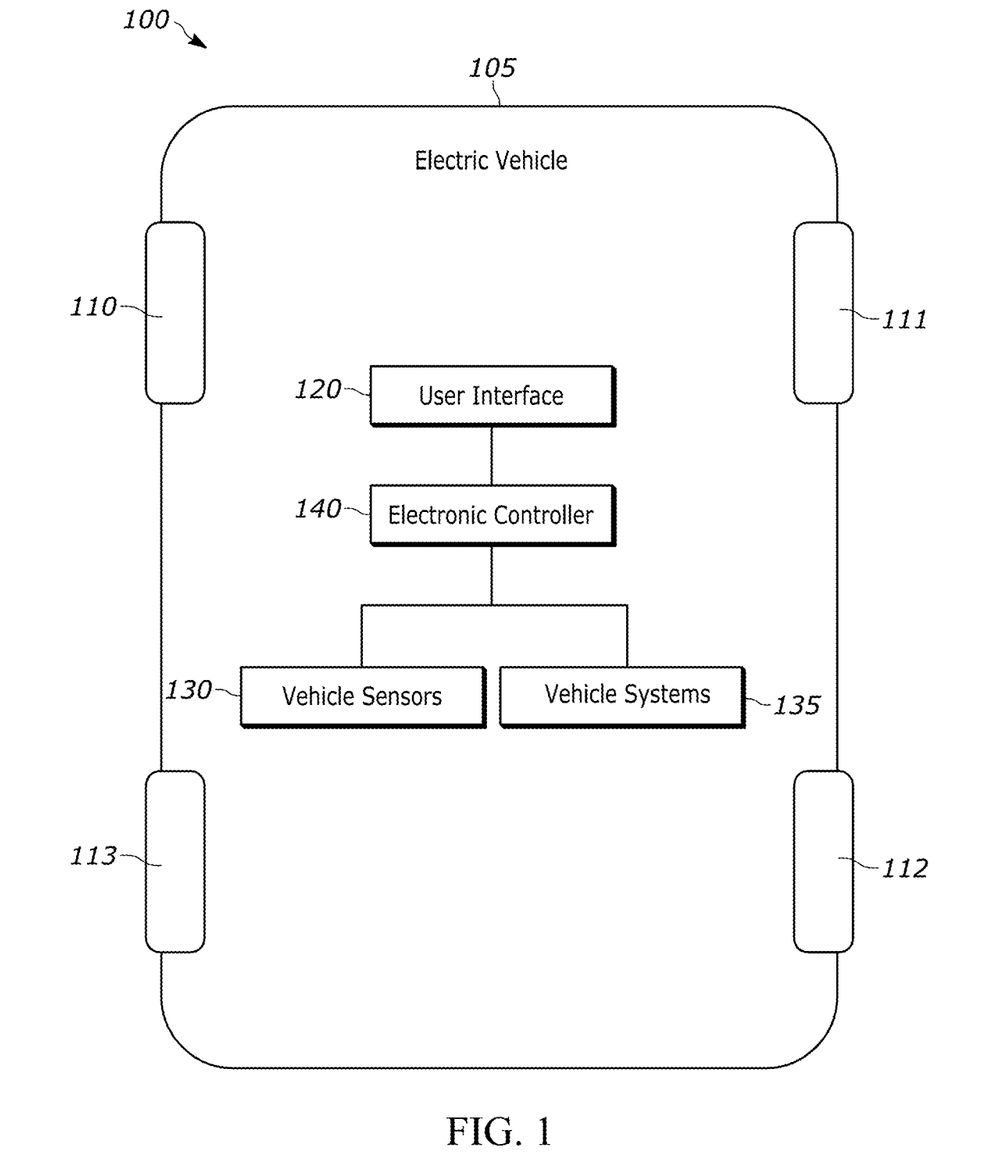
FIG. 1 illustrates a system for controlling a vehicle using driving behavior involving automatic emergency braking (AEB) events according to some instances.

FIG. 1 illustrates an example of a system 100 for controlling a vehicle 105 using driving behavior based on automatic emergency braking (AEB) events. The vehicle 105 may be an automobile, a truck, a tractor trailer, or another type of vehicle. The vehicle 105 is illustrated with four wheels 110-113 but may include more or fewer wheels based on the type of the vehicle 105. In some embodiments, the vehicle 105 is an autonomous or semi-autonomous vehicle.

In the example shown, the system 100 is installed in or integrated into the vehicle 105. The system 100 includes a human-machine interface 120, vehicle sensors 130, vehicle systems 135, and an electronic controller 140. The human-machine interface 120, the vehicle sensors 130, the vehicle systems 135, and the electronic controller 140, as well as other various modules and components of the vehicle 105 are communicatively coupled to each other via wired connections, wireless connections, or some combination thereof. All or parts of the connections used in the system 100 may be implemented using various communication networks, for example, a near field communication (NFC) network, a control area network (CAN), or other network. The use of communication networks for the interconnection between and exchange of information among the various modules and components would be apparent to a person skilled in the art in view of the description provided herein.

The human-machine interface 120 is a human-machine interface (HMI) that interfaces people with physical input hardware and output hardware. The human-machine interface 120 may include a display device for displaying a visual output, for example, a heads-up display, a center console display screen, and the like. The human-machine interface 120 provides visual output on the display device, for example, via a graphic user interface (GUI) having graphical elements. The GUI displayed on the human-machine interface 120 is, in one example, generated by the electronic controller 140, from instructions and data stored in memory, and presented on a center console display screen. The human-machine interface 120 may also provide a combination of visual, audio, and haptic outputs through output hardware included in the human-machine interface 120 or separate from the human-machine interface 120.

The vehicle sensors 130 provide sensor readings or output signals to the electronic controller 140 and are configured to detect, among other things, readings or signals associated with various attributes that characterize a user's driving behavior. For example, the attributes may include a total number of AEB events, vehicle deceleration, vehicle acceleration, pedal interactions, safety countermeasure activation, impact with an object, speed, time between AEB activations, passenger detection, seatbelt use detection, lane keep status, or lane departure events. In some instances, the vehicle sensors may be a part of one or more the vehicle systems 135.

The vehicle systems 135 may include controllers, sensors, actuators, or other devices for controlling and monitoring aspects of the operation of the vehicle 105 (for example, engine control, steering control, electronic stability control, traction control, anti-lock braking control, or other vehicle functions). The vehicle systems 135 are configured to send and receive data to and from the electronic controller 140.

Figure 2:
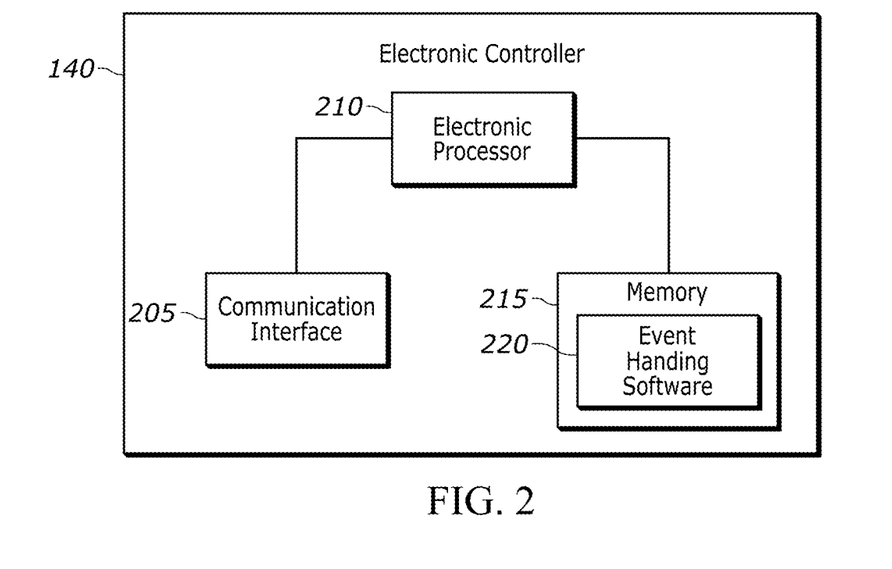
FIG. 2 illustrates an electronic controller according to some instances.

The system 100 also includes the electronic controller 140, which includes a plurality of electrical and electronic components that provide power, operational control, and protection to the components within the electronic controller 140. As shown in FIG. 2, the electronic controller 140 includes a communication interface 205, an electronic processor 210, and a memory 215. The communication interface 205 allows the electronic processor 210 to communicate with external hardware, such as the human-machine interface 120, the vehicle systems 135, another vehicle, and/or other devices or systems through wireless or wired communication techniques. In the example shown, the electronic processor 210 is configured to access the memory 215 and, among other things, execute instructions to carry out the methods and functions described herein. The electronic processor 210 may be a microprocessor, an application-specific integrated circuit ("ASIC"), or a similar processing circuit. The memory 215 is a non-transitory, computer-readable medium and contains instructions that, among other things, perform the methods and functions described herein when executed by the electronic processor 210.

The memory 215 includes, among other things, event handling software 220. The event handling software 220 uses inputs from various sensors, such as the vehicle sensors 130, to detect attributes related to an AEB event involving the vehicle 105. In one example, the event handling software 220 uses values associated with the attributes (e.g., AEB event data) from the vehicle sensors 130 to control one or more functions of the vehicle 105.

Figure 3A:
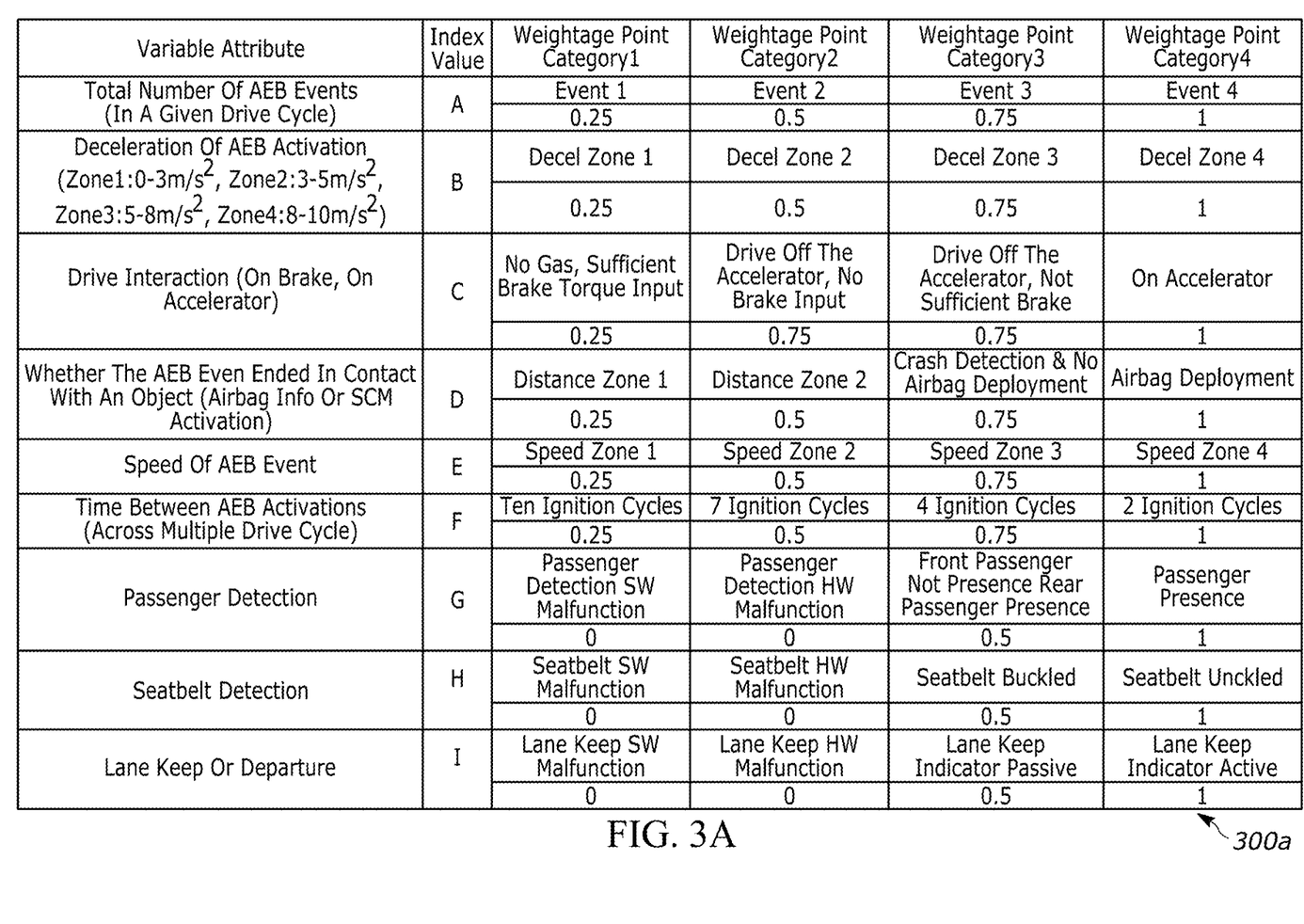
FIG. 3A is a table illustrating a driver behavior index according to some instances.

FIG. 3A illustrates an example of a scoring index 300a related to driving attributes of a user's driving behavior associated with an AEB event. In this example, the scoring index 300a includes a set of attributes, a set of index values, and a set of categories for scoring a driving behavior of a user. The set of attributes are driving behavior characteristics related to the AEB event. The set of index values are identifiers assigned to each attribute of the scoring index 300a. The set of categories are weighted values assigned to each attribute of the scoring index 300a that indicate a relative importance of hazardous or risky driving behavior of the user. For example, an attribute assigned to a category with a greater weighted value indicates a driving behavior with a higher risk than an attribute assigned to a category with a lesser weighted value. In some implementations, the scoring index 300a is modified to include, for example, additional vehicle features, vehicle functions, or autonomous vehicle attributes to monitor. In other implementations, the scoring index 300a is displayed to the user as a graphical user interface element via the human-machine interface 1200.

The set of attributes includes a total number of AEB events over a defined period of time, deceleration of AEB activation, driver interaction, object contact result of AEB event, vehicle speed associated with AEB event, time between AEB activations, passenger detection, seatbelt use detection, and lane keep status. The set of attributes is scalable and may include additional attributes, such as, for example, driver drowsiness, rapid lane changes, or other hazardous driving behaviors. In one instance, each attribute of the scoring index 300a is associated with detection criteria, for example, a set of conditions or rules, to monitor driver behavior and determine whether a driver is operating a vehicle according to the set of conditions or rules of the attributes.

FIG. 3B illustrates an example of a scoring index 300b related to scoring of driving attributes of a user's vehicle handling associated with an AEB event. The scoring index 300b includes the set of attributes, the set of index values, the set of categories for scoring the driving behavior of the driver, and category selections related to the user's vehicle handling of the AEB event. The category selections are designations of a weighted value related to a category for an attribute. The category selections can be based on violation or compliance with detection criteria and/or sensor readings and/or output signals of the vehicle sensors 130 or the vehicle systems 135. For example, the electronic controller 140 receives an output signal associated with an AEB event from the vehicle systems 135, such as, for example, a braking system. The electronic controller 140 receives sensor readings and/or output signals from the vehicle sensors 130, the vehicle systems 135, the memory 200, or combination thereof. In some implementations, the electronic controller 140 receives sensor readings or output signals corresponding to a defined time period before, during, and after receiving a signal that indicates activation of the automatic emergency braking system (e.g., AEB event). The electronic controller 140 utilizes detection criteria for each of the attributes and the received sensor readings and output signals to assign categories to the attributes. In some implementations, the scoring index 300b is displayed to the user as a graphical user interface element via the human-machine interface 1200.

Figure 3C:
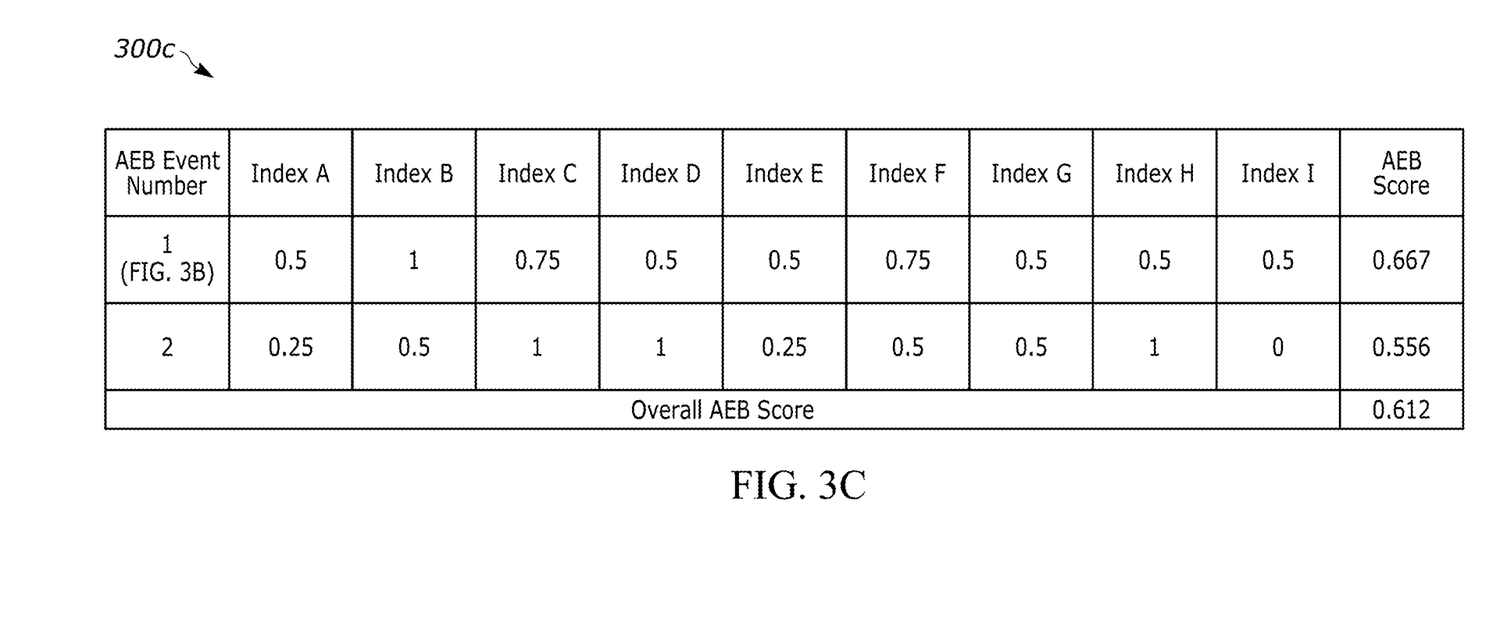
FIG. 3C is a table illustrating driver event scores associated with a driver behavior index according to some instances.

FIG. 3C illustrates an example of a driving behavior index 300c related to scoring of driving attributes of a user's vehicle handling associated with AEB events. The driving behavior index 300c may include one or more AEB events, a set of index value scores for each AEB event, a total AEB score for each AEB event, and an overall AEB score. The one or more AEB events are related to activations of AEB function while the user operates a vehicle. The set of index value scores are weighted values of a category assigned to an attribute for an AEB event. The total AEB score is an average of the set of index value scores for an AEB event. The overall AEB score is an average of the total AEB scores for the one or more AEB events of the driving behavior index 300c. In one aspect, the electronic controller 140 utilizes the scoring index 300b of FIG. 3B to create the driving behavior index 300c. The electronic controller 140 extracts the index values and the associated weighted values of the category selections from the scoring index 300b for an AEB event. The electronic controller 140 determines an AEB score for the AEB event and generates a table that includes the AEB score and the extracted information, such as, for example, the index values and the assigned weighted values. Also, the electronic controller 140 determines an overall AEB score for a user based on one or more AEB events. In some implementations, the driving behavior index 300c is displayed to the user as a graphical user interface element via the human-machine interface 120.

In one aspect, the electronic controller 140 utilizes sensor readings and/or output signals of the vehicle sensors 130 and the vehicle systems 135 to modify an overall AEB score of the driving behavior index 300c. In some implementations, the electronic controller 140 utilizes the detection criteria of attributes to increment or decrement the overall AEB score of the driving behavior index 300c. For example, the electronic controller 140 determines that the vehicle 105 has traveled a threshold distance (e.g., 50 miles) or a threshold time related to detection criteria of "Index Value F" without receiving an AEB event output signal from the vehicle systems 135 and decrements an overall AEB score for a user based on compliance with the detection criteria. In another example, the electronic controller 140 determines that the vehicle 105 has performed greater than a threshold number of lane changes within a threshold distance related to detection criteria of "Index Value I" and increments an overall AEB score for a user based on violation of the detection criteria. In an aspect, the electronic controller 140 transmits a communication that includes the driving behavior index 300c to other vehicles or remote computing devices. In some implementations, the electronic controller 140 can modify control thresholds based on driving behavior indexes related to drivers of the other vehicles within a threshold distance of the vehicle 105.

In an example, the electronic controller 140 utilizes a threshold value to monitor driving behavior of a user. In some implementations, the threshold value is a predefined maximum value related to an attribute. For example, the electronic controller 140 can activate a vehicle countermeasure based on a weighted value of an index value of the driving behavior index 300c for an attribute exceeding a threshold value. In other implementations, the threshold value is a predefined maximum value related to an overall AEB score. For example, the electronic controller 140 can activate a vehicle countermeasure based on an overall AEB score of the driving behavior index 300c exceeding a threshold value. In various implementations, a vehicle countermeasure can be activated to assist a user with corrective actions to driving behavior, predict hazardous driving scenarios, and stabilize vehicle handling and occupants. In some instances, the electronic controller 140 can trigger a notification or an actuator of a vehicle safety mechanism, such as, a seatbelt. For example, the electronic controller 140 can trigger a notification to display a warning and/or an audio haptic notification utilizing one or more devices of the vehicle 105. In other instances, the electronic controller 140 can modify one or more systems of the vehicle systems 135. For example, the electronic controller 140 triggers a brake prefill function of a braking system and/or modifies sensor monitoring thresholds to increase safety margins related to failsafe functions of the vehicle 105. In other instances, the electronic controller 140 stores sensor data or output signals of vehicle systems, the scoring index 300b and/or the driving behavior index 300c in the event of an accident following an AEB event, which enables a third party the ability to review user actions for a timeframe prior to, during, and/or following the AEB event or accident.

Figure 4:
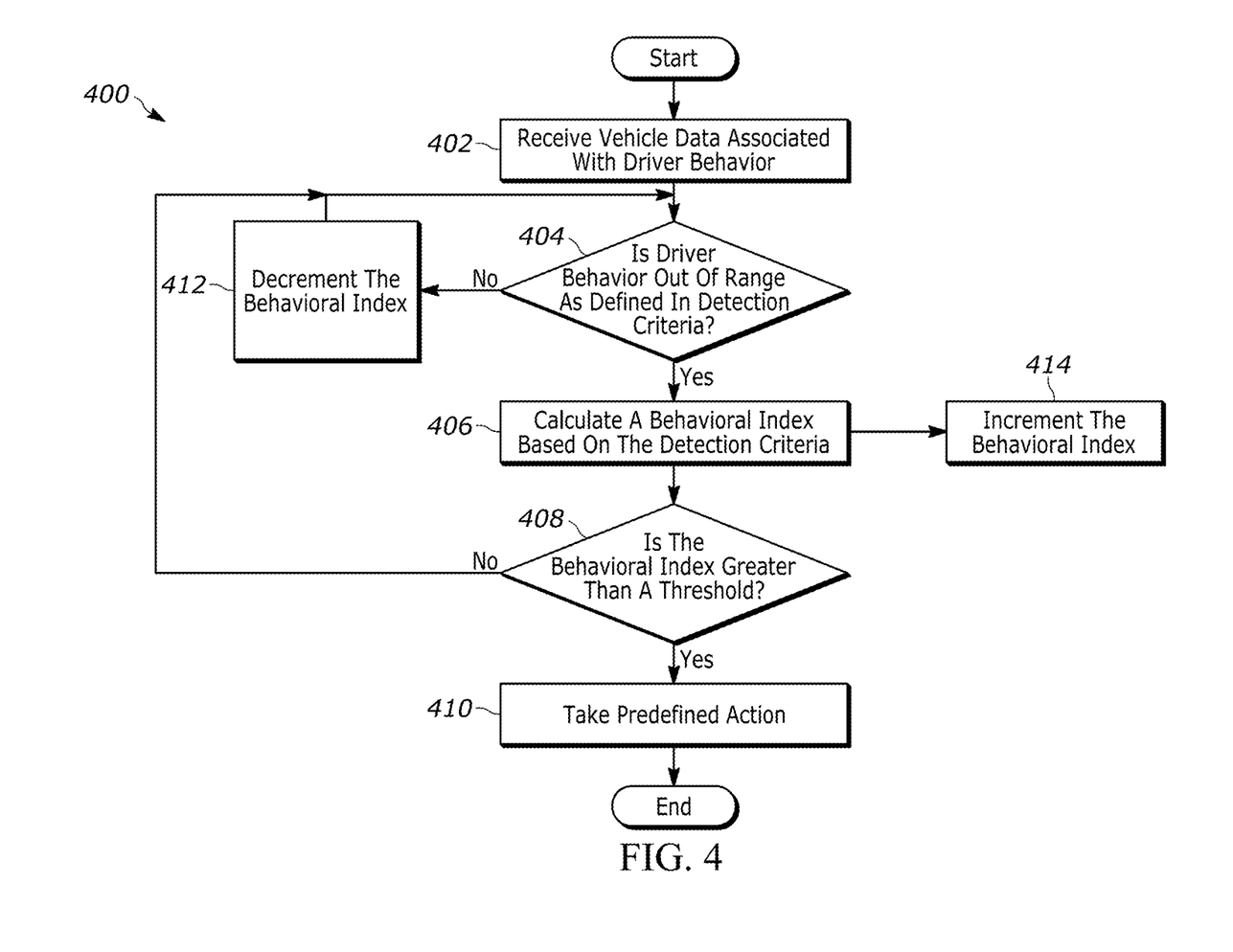
FIG. 4 illustrates a method for controlling a vehicle using driving behavior involving AEB events according to some instances.

As an example, the method 400 is explained in terms of the electronic controller 140, and, in particular, the electronic processor 210. However, portions of the method 400 may be distributed among multiple devices (for example, one or more additional controllers/processors of the system 100).

FIG. 4 illustrates a method 400 for controlling a vehicle using driving behavior involving AEB events according to one example. The method 400 includes receiving, with the electronic processor 210, vehicle data associated with a driving behavior of a user of the vehicle 105 (block 402). In some implementations, the electronic processor 210 receives the vehicle data in response to receiving an indication, such as, a signal from the vehicle systems 135 that is associated with an AEB event.

The method 400 may also include determining, with the electronic processor 210, whether the vehicle data indicates one or more attributes associated with the driver behavior of the user conforms with detection criteria (block 404). In one example, the electronic processor 210 determines whether an attribute (e.g., driving behavior or driving characteristic) associated with vehicle handling by a user violates detection criteria (e.g., a set of rules or conditions) of the attribute based on vehicle data received from the vehicle 105. In another example, the electronic processor 210 assigns a weighted value to an attribute (e.g., driving behavior, driving characteristic) associated with vehicle handling by a user based on detection criteria of the attribute and vehicle data received from the vehicle 105. In this example, the electronic processor 210 compares the weighted value of the attribute with an attribute threshold value to determine whether the attribute exceeds the attribute threshold value. In some instances, the electronic processor 210 determines that an attribute exceeds an attribute threshold value (block 404 "Yes" branch). In those instances, the electronic processor 210 calculates a score associated with the vehicle handling of the user (block 406).

The method 400 also includes calculating, with the electronic processor 210, a score associated with the vehicle handling of the user (block 406). In some implementations, the electronic processor 210 determines the score based on an assigned weighted values of one or more attributes for an AEB event. For example, the electronic processor 210 determines an average of a user's vehicle handling of an AEB event of the vehicle 105 using one or more weighted values of one or more attributes that the electronic processor 210 assigns based on received vehicle data. In other implementations, the electronic processor 210 determines the score based on scores associated with one or more AEB events. For example, the electronic processor 210 determines an average of one or more scores associated AEB event of a user's vehicle handling of the vehicle 105.

The method 400 also includes determining, with the electronic processor 210, whether the score associated with the vehicle handling of the user exceeds a score threshold (block 408). For example, the electronic processor 210 compares a score value associated with a vehicle handling of a user with a score threshold value to determine whether vehicle handling of a user exceeds a score threshold value. In some instances, the electronic processor 210 determines that a score value associated with a vehicle handling of a user is less than or equal to a score threshold value (block 408 "No" branch). In those instances, the electronic processor 210 may continue to monitor a vehicle to determine whether the vehicle data indicates one or more attributes associated with the driver behavior of the user conforms with detection criteria (block 404). In other instances, the electronic processor 210 determines that a score value associated with a vehicle handling of a user is greater than a score threshold value (block 408 "Yes" branch). In those instances, the electronic processor 210 takes a predefined action (block 410).

The method 400 also includes transmitting, with the electronic processor 210, a signal to a system of the vehicle 105 that activates a vehicle countermeasure (block 410). In some implementations, the electronic processor 210 activates a vehicle countermeasure based on one or more attributes. In other implementations, the electronic processor 210 activates a vehicle countermeasure based on an overall score associated with vehicle handling of AEB events by a user. In additional implementations, the electronic processor 210 activates a vehicle countermeasure based on a total AEB score and/or an overall AEB score of a vehicle in the vicinity of the vehicle 105.

The method 400 may also include decrementing, with the electronic processor 210, the score associated with the vehicle handling of the user (block 412). For example, the electronic processor 210 may decrement a score, such as, for example, the overall AEB score of the driving behavior index 300c. In some implementations, the electronic processor 210 decrements the overall AEB score in response to determining vehicle data indicates that a user complies with detection criterion of one or more attributes associated with driver behaviors (block 404 "No" branch). Additionally, the decrementing of the overall AEB score can occur without the electronic processor 210 receiving a signal associated with an AEB event.

The method 400 may also include incrementing, with the electronic processor 210, the score associated with the vehicle handling of the user (block 414). For example, the electronic processor 210 may increment a score, such as, for example, the overall AEB score of the driving behavior index 300c. In some implementations, the electronic processor 210 increments the overall AEB score in response to determining vehicle data indicates that a user violated detection criterion of one or more attributes associated with driver behaviors (block 404 "Yes" branch). Additionally, the incrementing of the overall AEB score can occur without the electronic processor 210 receiving a signal associated with an AEB event.

Figure 5:
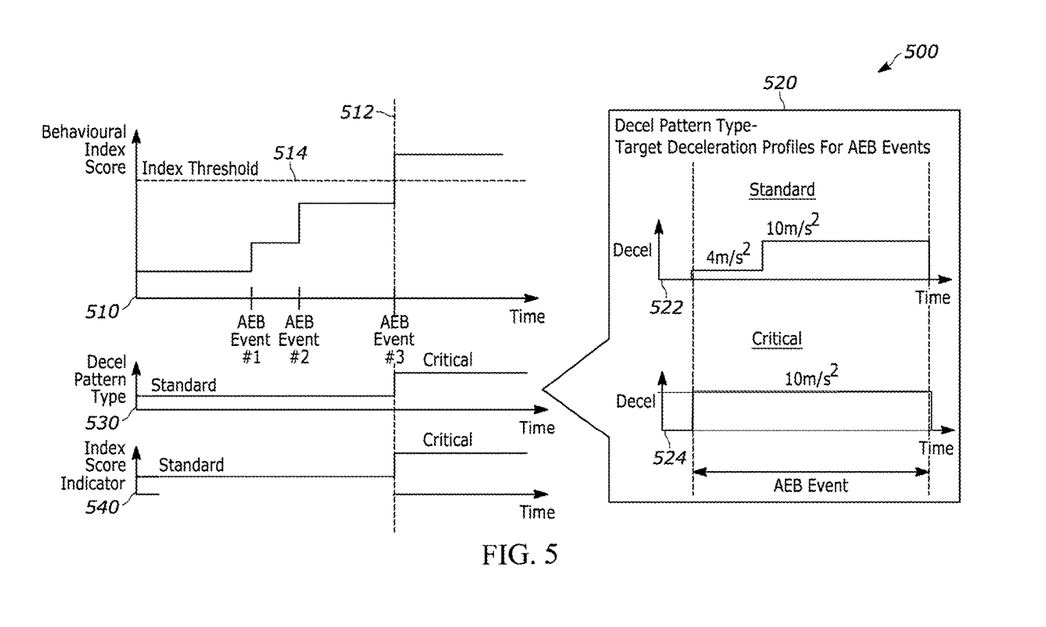
FIG. 5 illustrates a visualization related to modifications of an AEB system according to some instances.

FIG. 5 illustrates a visualization 500 related to a modification of an AEB system using the overall AEB score and an index value score of a driving attribute of a user's driving behavior. In this example, the visualization 500 includes an overall AEB score threshold chart 510, an index profile 520, an overall score modification chart 530, and an index value modification chart 540. The threshold chart 510 plots an overall AEB score to the AEB events of a vehicle with respect to time and displays the increase in the overall score as discussed above according to Block 414 of FIG. 4. The threshold chart 510 includes a timestamp 512 and an overall AEB score threshold 514. The timestamp 512 is an occurrence time of an AEB event associated with the overall score exceeds the overall AEB score threshold 514. The overall AEB score threshold 514 is threshold value that indicates that a user's driving behavior is frequently causing unsafe scenarios with the vehicle 105. The overall score modification chart 530 is an illustration of a modification to a braking system of the vehicle 105 with respect to the overall AEB score. The index value modification chart 540 is an illustration of a modification to a braking system of the vehicle 105 with respect to the index value score of index value B exceeding a threshold value.

The index profile 520 includes deceleration profiles for the vehicle 105 that are related to index value B (for example, as shown in FIGS. 3A-C). The index profile 520 includes a standard deceleration profile 522 and a critical deceleration profile 524. The standard deceleration profile 522 provides the vehicle 105 with a two (2) stage deceleration pattern. In one example, the first stage includes a deceleration of approximately 4 m/s$^2$, which may be referred to as a "standard" deceleration. In one example, the second stage includes a deceleration of approximately 10 m/s$^2$, which may be referred to as a "high" deceleration. It should be noted that the "standard" and "high" deceleration values are examples and the actual values may change, for example, depending on the vehicle in which the techniques described herein are used. The critical deceleration profile 524 provides the vehicle 105 with only a high deceleration.

Referring to the overall score modification chart 530, prior to the timestamp 512 the vehicle 105 operates using the standard deceleration profile 522. However, once the overall AEB score is incremented due to AEB event #3 and the overall AEB score threshold 514 is achieved, the electronic processor 210 modifies the breaking profile of the vehicle 105 to utilize the critical deceleration profile 524. Thus, the braking system increases the targeted braking deceleration for AEB activations so that all AEB braking is performed at the highest allowable deceleration for the vehicle 105.

Referring now to the index value modification chart 540, in some implementations, prior to AEB event #3 the electronic processor 210 determines that index value B is out of range. In those implementations, the electronic processor 210 modifies the braking system with the critical deceleration profile 524 to make the AEB trigger conditions more sensitive and trigger sooner when the overall AEB score threshold 514 is achieved (e.g., when within a measured threshold distance to an object).

Thus, this disclosure provides, among other things, systems, methods, and apparatuses for controlling a vehicle based on driving behavior involving AEB events. Additionally, this disclosure provides a mechanism to monitor and rate the ability of a driver to handle AEB events and activating a vehicle countermeasure based on the rated ability of the driver.

In the foregoing specification, specific examples, aspects, features, and instances have been described. However, one of ordinary skill in the art appreciates that various modifications and changes can be made without departing from the scope of the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

Although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Various features, advantages, and aspects are set forth in the following claims.

What is claimed is:

1. A system for controlling a vehicle using driving behavior involving automatic emergency braking (AEB) events, the system comprising:
  a scoring index related to driving attributes of a user for handling automatic emergency braking (AEB) events, wherein the scoring index includes a set of driving attributes and a set of categories for scoring a driving behavior of the user, wherein the set of categories indicate varying amounts of risk for the set of driving attributes, wherein the set of driving attributes includes a deceleration profile of an AEB activation and a time between AEB activations;
  a plurality of sensors; and
  an electronic processor configured to
    receive, from the plurality of sensors, event data of an attribute of the driving behavior of the user related to handling an AEB event of a vehicle;
    assign, using the scoring index, a weighted value to the attribute based on a set of conditions for the attribute and the event data;
    determine, using the scoring index, an event score of the driving behavior related to the AEB event based on the weighted value of the attribute;
    determine a driving behavior score of the user based on the event score, wherein the driving behavior score is an overall score based on one or more AEB events handled by the user;
    responsive to determining the driving behavior score of the user is greater than a driving behavior threshold, activate a vehicle countermeasure related to one or more attributes; and
    modify a sensor threshold related to initiation of a vehicle function based at least in part on the driving behavior score.

2. The system of claim 1, wherein the electronic processor is further configured to:
  responsive to determining that a driving activity of the user violates the set of conditions, increment the driving behavior score.

3. The system of claim 1, wherein the electronic processor is further configured to:
  responsive to determining that a driving activity of the user complies with the set of conditions, decrement the driving behavior score.

4. The system of claim 1, wherein the electronic processor is further configured to:
  generate a graphical user interface element that includes the attribute, the weighted value, the event score, and the driving behavior score.

5. The system of claim 1, wherein the electronic processor is further configured to:

transmit a message to a remote computing device that includes the attribute, the weighted value, the event score, and the driving behavior score.

6. The system of claim 1, wherein the electronic processor is further configured to:
responsive to determining the weighted value of the attribute is greater than an attribute threshold value, transmit a notification to the user based on the attribute, wherein the notification is at least one selected from a group consisting of a visual output, an audio output, and haptic output.

7. The system of claim 1, wherein the electronic processor is further configured to:
detect an impact within a temporal threshold after the AEB event; and
store the received event data related to the attribute for a defined timeframe, wherein the defined timeframe includes a period of time before and after the AEB event.

8. A method for controlling a vehicle using driving behavior involving automatic emergency braking (AEB) events of a vehicle, the method comprising:
creating an index related to driving attributes of a user for handling automatic emergency braking (AEB) events, wherein the index includes a set of driving attributes and a set of categories for scoring a driving behavior of the user, wherein the set of categories indicate varying amounts of risk for the driving attributes of the user, wherein the set of driving attributes includes a deceleration profile of an AEB activation and a time between AEB activations;
receiving, by an electronic processor, from a plurality of sensors of a vehicle, event data of an attribute of a driving behavior of a user related to handling an automatic emergency braking (AEB) event of a vehicle;
assigning, by the electronic processor using the scoring index, a weighted value to the attribute based on a set of conditions for the attribute and the event data;
determining, by the electronic processor using the scoring index, an event score of the driving behavior related to the AEB event based on the weighted value of the attribute;
determining, by the electronic processor, a driving behavior score of the user based on the event score, wherein the driving behavior score is an overall score based on one or more AEB events handled by the user;
responsive to determining the driving behavior score of the user is greater than a driving behavior threshold, activating, by the electronic processor, a vehicle countermeasure related to one or more attributes; and
modifying, by the electronic processor, a sensor threshold related to initiation of a vehicle function based at least in part on the driving behavior score.

9. The method of claim 8, further comprising:
responsive to determining the weighted value of the attribute is greater than an attribute threshold value, activating, by the electronic processor, a vehicle countermeasure related to the attribute.

10. The method of claim 8, further comprising:
responsive to determining that a driving activity of the user violates the set of conditions, incrementing, by the electronic processor, the driving behavior score.

11. The method of claim 8, further comprising:
responsive to determining that a driving activity of the user complies with the set of conditions, incrementing, by the electronic processor, the driving behavior score.

12. The method of claim 8, further comprising:
generating, by the electronic processor, a graphical user interface element that includes the attribute, the weighted value, the event score, and the driving behavior score.

13. The method of claim 8, further comprising:
transmitting, by the electronic processor, a message to a remote computing device that includes the attribute, the weighted value, the event score, and the driving behavior score.

14. The method of claim 8, further comprising:
responsive to determining the weighted value of the attribute is greater than an attribute threshold value, transmitting, by the electronic processor, a notification to the user based on the attribute, wherein the notification is least one selected from a group consisting of a visual output, an audio output, and haptic output.

15. The method of claim 8, further comprising:
detecting, by the electronic processor, an impact within a temporal threshold after the AEB event; and
storing, by the electronic processor, the received event data related to the attribute for a defined timeframe, wherein the defined timeframe includes a period of time before and after the AEB event.

16. The system of claim 1, wherein the system further comprises a communication interface, wherein the electronic processor is further configured to:
determine a second vehicle is proximate to the vehicle;
receive, from the second vehicle via the communication interface, a second driving behavior score of a different user of the second vehicle;
activate the vehicle countermeasure of the vehicle based on the second driving behavior score and a driving behavior threshold for the different user, wherein the vehicle countermeasure includes a brake prefill function of a braking system.

17. The system of claim 1, wherein the set of driving attribute further includes a total number of AEB events over a defined period of time, a driver interaction, an object contact result of an AEB event, a vehicle speed associated with an AEB event, a passenger detection, a seatbelt use detection, and a lane keep status.

18. A system for controlling a vehicle using driving behavior involving automatic emergency braking (AEB) events, the system comprising:
a scoring index related to driving attributes of a user for handling automatic emergency braking (AEB) events, wherein the scoring index includes a set of driving attributes and a set of categories for scoring a driving behavior of the user, wherein the set of categories indicate varying amounts of risk for the set of driving attributes, wherein the set of driving attributes includes a deceleration profile of an AEB activation and a time between AEB activations;
a plurality of sensors; and
an electronic processor configured to
receive, from the plurality of sensors, event data of an attribute of the driving behavior of the user related to handling an AEB event of a vehicle;
assign, using the scoring index, a weighted value to the attribute based on a set of conditions for the attribute and the event data;
determine, using the scoring index, an event score of the driving behavior related to the AEB event based on the weighted value of the attribute;

determine a driving behavior score of the user based on the event score, wherein the driving behavior score is an overall score based on one or more AEB events handled by the user;

responsive to determining the driving behavior score of the user is greater than a driving behavior threshold, activate a vehicle countermeasure related to one or more attributes; and responsive to determining the weighted value of the attribute is greater than an attribute threshold value, activate a vehicle countermeasure related to the attribute.

* * * * *